US012695141B2

(12) United States Patent
Wu et al.

(10) Patent No.: US 12,695,141 B2
(45) Date of Patent: Jul. 28, 2026

(54) BATTERY AND BATTERY MODULE

(71) Applicant: EVE Power Co., Ltd., Hubei (CN)

(72) Inventors: Di Wu, Hubei (CN); Kaibo Li, Hubei (CN); Wei He, Hubei (CN); Jincheng Liu, Hubei (CN)

(73) Assignee: EVE POWER CO., LTD., Hubei (CN)

( * ) Notice: Subject to any disclaimer, the term of this patent is extended or adjusted under 35 U.S.C. 154(b) by 532 days.

(21) Appl. No.: 18/283,990

(22) PCT Filed: Oct. 14, 2022

(86) PCT No.: PCT/CN2022/125255
§ 371 (c)(1),
(2) Date: Sep. 25, 2023

(87) PCT Pub. No.: WO2023/206981
PCT Pub. Date: Nov. 2, 2023

(65) Prior Publication Data
US 2025/0087795 A1     Mar. 13, 2025

(30) Foreign Application Priority Data
Apr. 29, 2022    (CN) .......................... 202221074144.8

(51) Int. Cl.
*H01M 50/152*          (2021.01)
*H01M 50/107*          (2021.01)
(Continued)

(52) U.S. Cl.
CPC ....... *H01M 50/152* (2021.01); *H01M 50/107* (2021.01); *H01M 50/184* (2021.01);
(Continued)

(58) Field of Classification Search
CPC ............. H01M 50/152; H01M 50/107; H01M 50/184; H01M 50/188; H01M 50/3425;
(Continued)

(56) References Cited

U.S. PATENT DOCUMENTS

2006/0204841 A1* 9/2006 Satoh .................. H01M 50/533
                                                            29/623.2
2020/0091551 A1    3/2020 Sodeyama
(Continued)

FOREIGN PATENT DOCUMENTS

CN          106549132 A      3/2017
CN          208315617 U      1/2019
(Continued)

OTHER PUBLICATIONS

Korean Office Action dated Jul. 23, 2025 issued in KR Application No. 10-2023-7021580, 8 pages.
(Continued)

*Primary Examiner* — Kaity V Chandler
(74) *Attorney, Agent, or Firm* — HUNTON ANDREWS KURTH LLP

(57)          ABSTRACT
A battery includes a housing, a core, a first connection piece, and a plate. The core is disposed in the housing. The first connection piece is disposed on one end of the housing. The first connection piece is connected to the core. The plate is disposed on the side of the first connection piece facing away from the core. The side surface of the plate facing away from the first connection piece is provided with at least two concave arc-shaped grooves at intervals. All of the arc-shaped grooves are uniformly disposed annularly along the center of the plate. Groove bottoms of the arc-shaped grooves are welded to the first connection piece.

20 Claims, 6 Drawing Sheets

(51) Int. Cl.

| | |
|---|---|
| *H01M 50/184* | (2021.01) |
| *H01M 50/188* | (2021.01) |
| *H01M 50/342* | (2021.01) |
| *H01M 50/548* | (2021.01) |
| *H01M 50/627* | (2021.01) |

(52) U.S. Cl.
CPC ..... *H01M 50/188* (2021.01); *H01M 50/3425* (2021.01); *H01M 50/548* (2021.01); *H01M 50/627* (2021.01)

(58) Field of Classification Search
CPC ............. H01M 50/548; H01M 50/627; H01M 50/105; H01M 50/213; H01M 50/325; H01M 50/538; Y02E 60/10
See application file for complete search history.

(56) References Cited

U.S. PATENT DOCUMENTS

| | | | | |
|---|---|---|---|---|
| 2020/0144584 A1* | 5/2020 | Zeng | ................... | H01M 50/536 |
| 2025/0087795 A1* | 3/2025 | Wu | ..................... | H01M 50/152 |

FOREIGN PATENT DOCUMENTS

| | | | | | |
|---|---|---|---|---|---|
| CN | 111668534 | A | * | 9/2020 | .......... H01M 10/052 |
| CN | 211455885 | U | * | 9/2020 | ............. Y02E 60/10 |
| CN | 113571848 | A | | 10/2021 | |
| CN | 215989122 | U | | 3/2022 | |
| CN | 216354464 | U | | 4/2022 | |
| CN | 114824674 | A | * | 7/2022 | .......... H01M 50/528 |
| EP | 0504160 | B1 | | 2/1996 | |
| JP | 2001210384 | A | | 8/2001 | |
| JP | 4020590 | B2 | * | 12/2007 | ............. Y02E 60/10 |
| JP | 2020068172 | A | | 4/2020 | |
| JP | 2023548004 | A | | 11/2021 | |
| KR | 10-2011-0035566 | A | | 4/2011 | |
| KR | 20180017399 | A | * | 2/2018 | .............. H01M 2/04 |
| KR | 20200063396 | A | * | 6/2020 | .............. B60L 58/26 |
| WO | 200111701 | A1 | | 2/2001 | |

OTHER PUBLICATIONS

Patent Evaluation special date Jun. 14, 2024 issued in JP 2023-535889.
Extended European Search Report dated Apr. 3, 2024 received in EP 22927599.5.
International Search Report and Written opinion dated Jan. 13, 2023 issued in PCT/CN2022/125255.

\* cited by examiner

3

1

5

BATTERY AND BATTERY MODULE

CROSS REFERENCE TO RELATED APPLICATIONS

This is a National Stage Application, filed under 35 U.S.C. 371, of International Patent Application No. PCT/CN2022/125255, filed on Oct. 14, 2022, which claims priority to Chinese Patent Application No. 202221074144.8 filed with the China National Intellectual Property Administration (CNIPA) on Apr. 29, 2022, contents of all of which are incorporated herein by reference in their entireties.

TECHNICAL FIELD

The present application relates to the field of battery technology, for example, a battery and a battery module.

BACKGROUND

A battery includes a pole, a plate, a connection piece, a core, and a housing. The core is disposed in the housing. The plate and the connection piece are both disposed on one opening end of the housing to seal the housing. The plate and the connection piece are fixed by laser welding. Pole holes and explosion-proof holes are disposed on the plate at intervals. The pole holes are disposed in the middle of the plate. Each pole is inserted into a pole hole and connected to the core to form an electrode of the battery. This battery structure has the disadvantage that, to ensure the strength of the plate, the plate has a certain thickness, resulting in that a laser is not easy to penetrate through the plate, which affects the welding and fixing between the plate and the connection piece. Thus, the welding effect between the plate and the connection piece is affected.

SUMMARY

Embodiments of the present application provide a battery with a simple structure and a good explosion-proof effect.

The embodiments of the present application also provide a battery module with high safety.

In a first aspect, an embodiment of the present application provides a battery. The battery includes a housing, a core, a first connection piece, and a plate. The core is disposed in the housing. The first connection piece is disposed on one end of the housing. The first connection piece is connected to the core. The plate is disposed on the side of the first connection piece facing away from the core. The side surface of the plate facing away from the first connection piece is provided with at least two concave arc-shaped grooves at intervals. All of the arc-shaped grooves are uniformly disposed annularly along the center of the plate. Groove bottoms of the arc-shaped grooves are welded to the first connection piece.

In an embodiment, an explosion-proof hole is disposed in the middle of the plate. The first connection piece is provided with a vent. The vent is opposite to the explosion-proof hole. The side surface of the plate adjacent to the first connection piece is provided with a first boss. The first boss surrounds the explosion-proof hole. The end surface of the first boss facing away from the plate is connected to the first connection piece.

In an embodiment, two arc-shaped grooves are provided. The two arc-shaped grooves are symmetrically disposed along the explosion-proof hole. A liquid injection hole is disposed on the plate. The liquid injection hole is disposed on the symmetrical axis of the two arc-shaped grooves.

In an embodiment, the side surface of the first connection piece facing the plate is provided with a second boss corresponding to the arc-shaped grooves. The second boss abuts against the plate.

In an embodiment, the length of the wide side of the second boss is L1. The length of the wide side of each of the two arc-shaped grooves is L2, where L1>L2.

In an embodiment, the second boss is annular. Alternatively, a plurality of second bosses are provided. The number of the plurality of second bosses matches the number of arc-shaped grooves.

In an embodiment, the first connection piece is provided with a plurality of liquid leakage holes. All of the plurality of liquid leakage holes are disposed between the second boss and the edge of the first connection piece.

In an embodiment, the plate is connected to the housing to jointly form a first electrode of the battery.

In an embodiment, the side surface of the plate facing away from the first connection piece is a planar structure.

In an embodiment, the battery also includes a pole and a sealing ring. The end surface of the housing facing away from the plate is provided with a pole hole. Part of the pole is inserted into the pole hole. The sealing ring is disposed between the housing and the pole.

In a second aspect, an embodiment of the present application provides a battery module. The battery module includes the preceding battery.

The embodiments of the present application have the beneficial effects that, in the battery, the side surface of the plate facing away from the first connection piece is provided with at least two concave arc-shaped grooves at intervals. All of the arc-shaped grooves are uniformly disposed annularly along the center of the plate. Groove bottoms of the arc-shaped grooves are welded to the first connection piece. The thickness of plate is relatively thin at the welded position due to the arrangement of the arc-shaped grooves. This not only facilitates welding between the plate and the first connection piece, thereby improving the welding effect between the plate and the first connection piece, but also can reduce the overall weight of the battery.

BRIEF DESCRIPTION OF DRAWINGS

The present application is further described in detail according to the drawings and embodiments.

Figure 1:
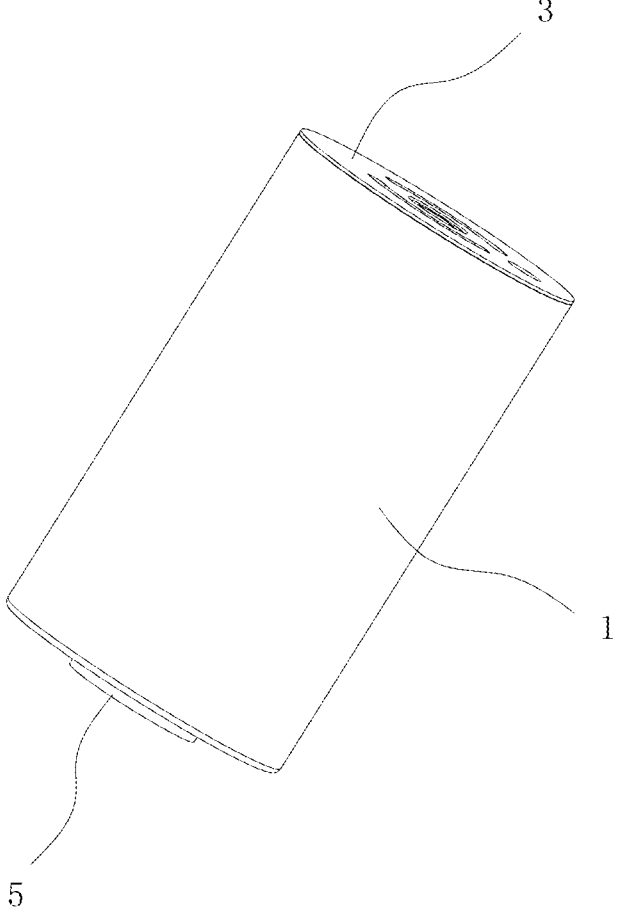
FIG. 1 is a view of a battery according to some embodiments of the present application.

REFERENCE LIST 1 housing
11 pole hole
2 core
3 first connection piece
31 vent
32 second boss
33 liquid leakage hole
4 plate
41 explosion-proof hole

42 arc-shaped groove
43 first boss
44 liquid injection hole
5 pole
6 sealing ring
7 second connection piece
8 explosion-proof valve

DETAILED DESCRIPTION

In the description of the present application, unless otherwise expressly specified and limited, the term "connected to each other", "connected", or "fixed" is to be construed in a broad sense, for example, as fixedly connected, detachably connected, or integrated; mechanically connected or electrically connected; directly connected to each other or indirectly connected to each other via an intermediary; or internally connected between two elements or interaction relations between two elements. For those of ordinary skill in the art, meanings of the preceding terms can be understood according to situations in the present application.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

Figure 2:
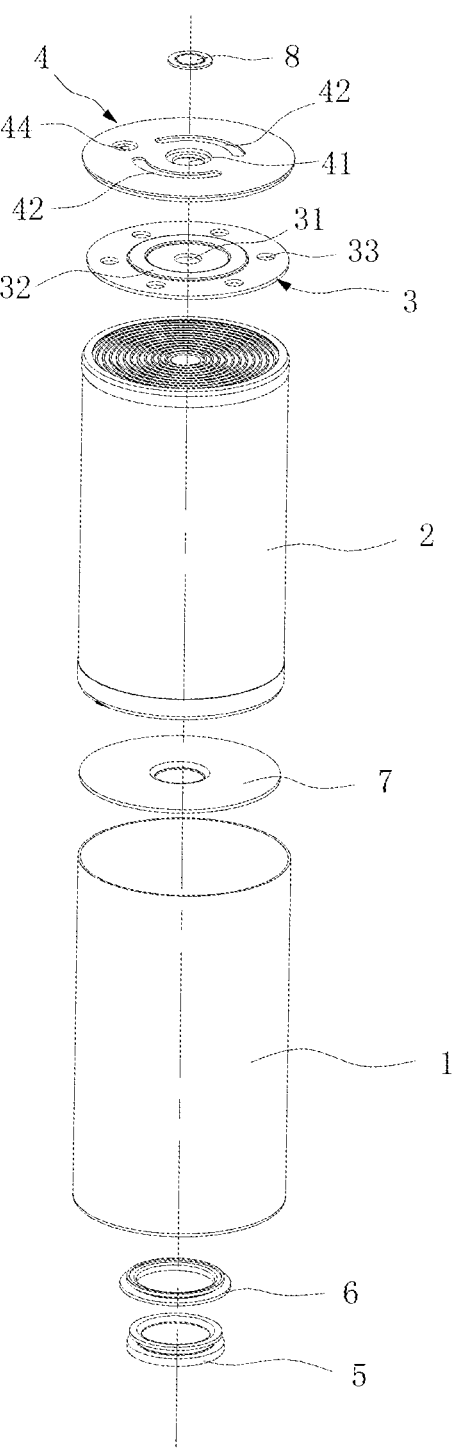
FIG. 2 is an exploded view of a battery according to some embodiments of the present application.

As shown in FIG. 1 and FIG. 2, a battery in the present application includes a housing 1, a core 2, a first connection piece 3, and a plate 4. The core 2 is disposed in the housing 1. The first connection piece 3 is disposed on one end of the housing 1. The first connection piece 3 is connected to the core 2. The plate 4 is disposed on the side of the first connection piece 3 facing away from the core 2. The side surface of the plate 4 facing away from the first connection piece 3 is provided with at least two concave arc-shaped grooves 42 at intervals. All of the arc-shaped grooves 42 are uniformly disposed annularly along the center of the plate 4. Groove bottoms of the arc-shaped grooves 42 are welded to the first connection piece 3. In the battery, the side surface of the plate facing away from the first connection piece is provided with at least two concave arc-shaped grooves at intervals. All of the arc-shaped grooves are uniformly disposed annularly along the center of the plate. Groove bottoms of the arc-shaped grooves are welded to the first connection piece. The thickness of the plate is relatively thin at the welded position due to the arrangement of the arc-shaped grooves. This not only facilitates welding between the plate and the first connection piece, thereby improving the welding effect between the plate and the first connection piece, but also can reduce the overall weight of the battery.

Exemplarily, the plate 4 and the first connection piece 3 are welded by laser welding. The laser welding has a penetrating effect so that the plate 4 can be welded and fixed to the first connection piece 3 through the groove bottoms of the arc-shaped grooves 42 during welding.

Figure 3:
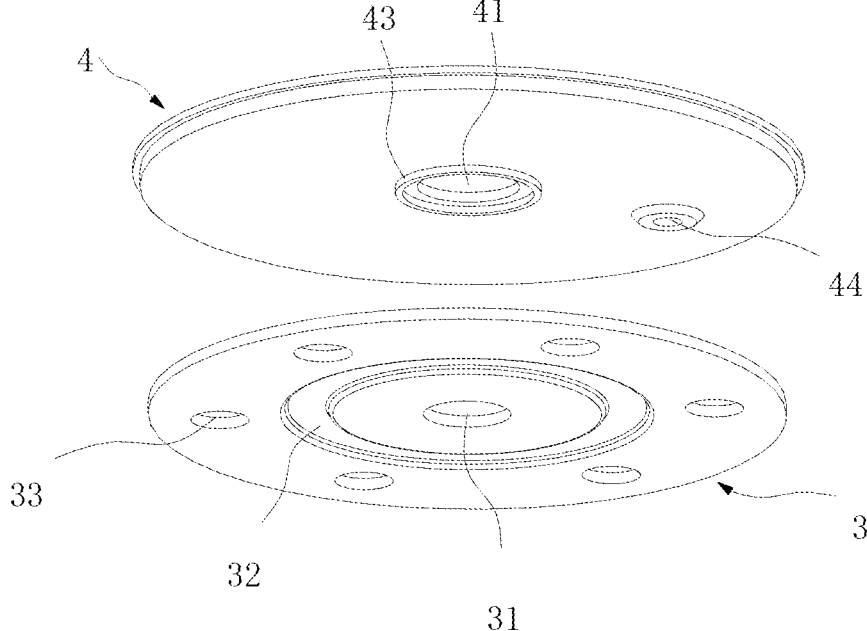
FIG. 3 is a partial exploded view of a battery according to some embodiments of the present application.

In an embodiment, as shown in FIG. 2 and FIG. 3, an explosion-proof hole 41 is disposed in the middle of the plate 4. The first connection piece 3 is provided with a vent 31. The vent 31 is opposite to the explosion-proof hole 41. The side surface of the plate 4 adjacent to the first connection piece 3 is provided with a first boss 43. The first boss 43 surrounds the explosion-proof hole 41. The end surface of the first boss 43 facing away from the plate 4 is connected to the first connection piece 3.

The battery is provided with an explosion-proof hole 41 in the middle of the plate 4. When the air pressure inside the core 2 rises, the gas in the periphery of the core 2 can flow rapidly to the explosion-proof hole 41 in the middle. Then, the gas is discharged out of the core 2 from the explosion-proof hole 41 such that the flow distance of the gas in the housing 1 is reduced, thereby improving the explosion-proof effect of the battery. The first connection piece 3 of this structure is directly connected to the core 2. Compared with a battery structure in which a connection piece needs to be folded, in this structure, the folding space is saved, and the assembly of the whole battery is facilitated. In addition, the side surface of the plate 4 adjacent to the first connection piece 3 is provided with the first boss 43. The first boss 43 surrounds the explosion-proof hole 41. In other words, the first boss 43 is annular. The end of the first boss 43 adjacent to the first connection piece 3 surrounds the periphery of the vent 31. Thus, the first boss 43 can serve as a gas flow passage between the first connection piece 3 and the plate 4, thereby making an explosion-proof valve 8 disposed on the explosion-proof hole 41 easier to explode, thereby further improving the safety performance of the battery.

In an embodiment, since the first boss 43 is disposed on the plate 4, a certain spacing is provided between the first connection piece 3 and the plate 4. If the spacing between the first connection piece 3 and the plate 4 is too large, the welding effect between the first connection piece 3 and the plate 4 is reduced. Therefore, to solve the preceding problem, a protruding second boss 32 is disposed on the side surface of the first connection piece 3 facing the plate 4. The first boss 43 and the second boss 32 are staggered. The second boss 32 abuts against a side surface of the plate 4. That is, the second boss 32 is connected to the groove bottoms of the arc-shaped grooves 42. Thus, the gap of the welding position between the first connection piece 3 and the plate 4 is eliminated, thereby improving the welding effect between the first connection piece 3 and the plate 4.

The length of the wide side of the second boss 32 is L1. The length of the wide side of an arc-shaped groove 42 is L2, where L1>L2. This design can ensure the welding stability between the first connection piece 3 and the plate 4. During the assembly of the battery, even if the offset occurs between the arc-shaped grooves 42 and the second boss 32, the welding effect between the first connection piece 3 and the plate 4 is not affected.

In an embodiment, the second boss 32 is annular. On the one hand, the design eliminates the need for a worker to assemble the plate 4 according to a specified angle, and the arc-shaped grooves 42 in the plate 4 can correspond to the second boss 32. On the other hand, the second boss 32 may serve as a reinforcing rib of the first connection piece 3, thereby improving the strength of the first connection piece 3.

In an embodiment, two arc-shaped grooves 42 are provided. The two arc-shaped grooves 42 are symmetrically disposed along the explosion-proof hole 41. A liquid injection hole 44 is disposed on the plate 4. The liquid injection hole 44 is disposed on the symmetrical axis of the two arc-shaped grooves 42. In the production process, a liquid injection plug is generally used to inject liquid into the liquid injection hole 44. The size of the liquid injection plug is generally greater than that of the liquid injection hole 44. If the liquid injection hole 44 is not disposed on the symmetrical axis, the liquid injection plug may be inclined to an arc-shaped groove 42 on one side. Air and an electrolyte may leak out during liquid injection, resulting in low qualification rate and low efficiency of products.

As shown in FIG. 2 and FIG. 3, the first connection piece 3 is provided with multiple liquid leakage holes 33. After a worker injects the electrolyte into the liquid injection hole 44, the electrolyte is discharged to the first connection piece 3. Then, the electrolyte flows into the housing 1 uniformly from the multiple liquid leakage holes 33. All of the liquid leakage holes 33 are disposed between the second boss 32 and the edge of the first connection piece 3. The second boss 32 can protect the explosion-proof hole 41 to prevent the electrolyte from blocking the explosion-proof hole 41. In an embodiment, six liquid leakage holes 33 are provided. The six liquid leakage holes 33 are annularly distributed along the explosion-proof hole 41. In other embodiments, the liquid leakage holes 33 may be provided in other numbers. This is not limited in this embodiment.

In an embodiment, multiple arc-shaped grooves 42 are provided. Multiple second bosses 32 are also provided corresponding to the multiple arc-shaped grooves 42. The number of arc-shaped grooves 42 matches the number of second bosses 32 so that second bosses 32 are disposed at the positions of arc-shaped grooves 42 in a one-to-one manner. Three arc-shaped grooves 42 are provided. The three arc-shaped grooves 42 are annularly distributed at the periphery of the explosion-proof hole 41. Three second bosses 32 are also provided. Thus, the three arc-shaped grooves 42 correspond to the three second bosses 32 in a one-to-one manner. Of course, the second bosses 32 and the arc-shaped grooves 42 may also be provided in other numbers. This is not limited in this embodiment.

Exemplarily, the second boss 32 is formed by stamping the first connection piece 3. The stamping process is simple, the processing cost is low, and there is no need to add a reinforcing material to the first connection piece 3, thereby effectively controlling the weight of the first connection piece 3.

Exemplarily, the plate 4 is welded with the housing 1 to jointly form a first electrode of the battery, facilitating corrosion prevention of the housing 1, thereby increasing the service life of the battery. In this embodiment, the first electrode is a positive electrode.

Exemplarily, the side surface of the plate 4 facing away from the first connection piece 3 is a planar structure. Thus, the side of the battery mounting the plate 4 does not have local protrusion. That is, the side surface of the plate 4 eliminates the design of the pole, thereby reducing the manufacturing cost and increasing the energy density of the battery.

Figure 4:
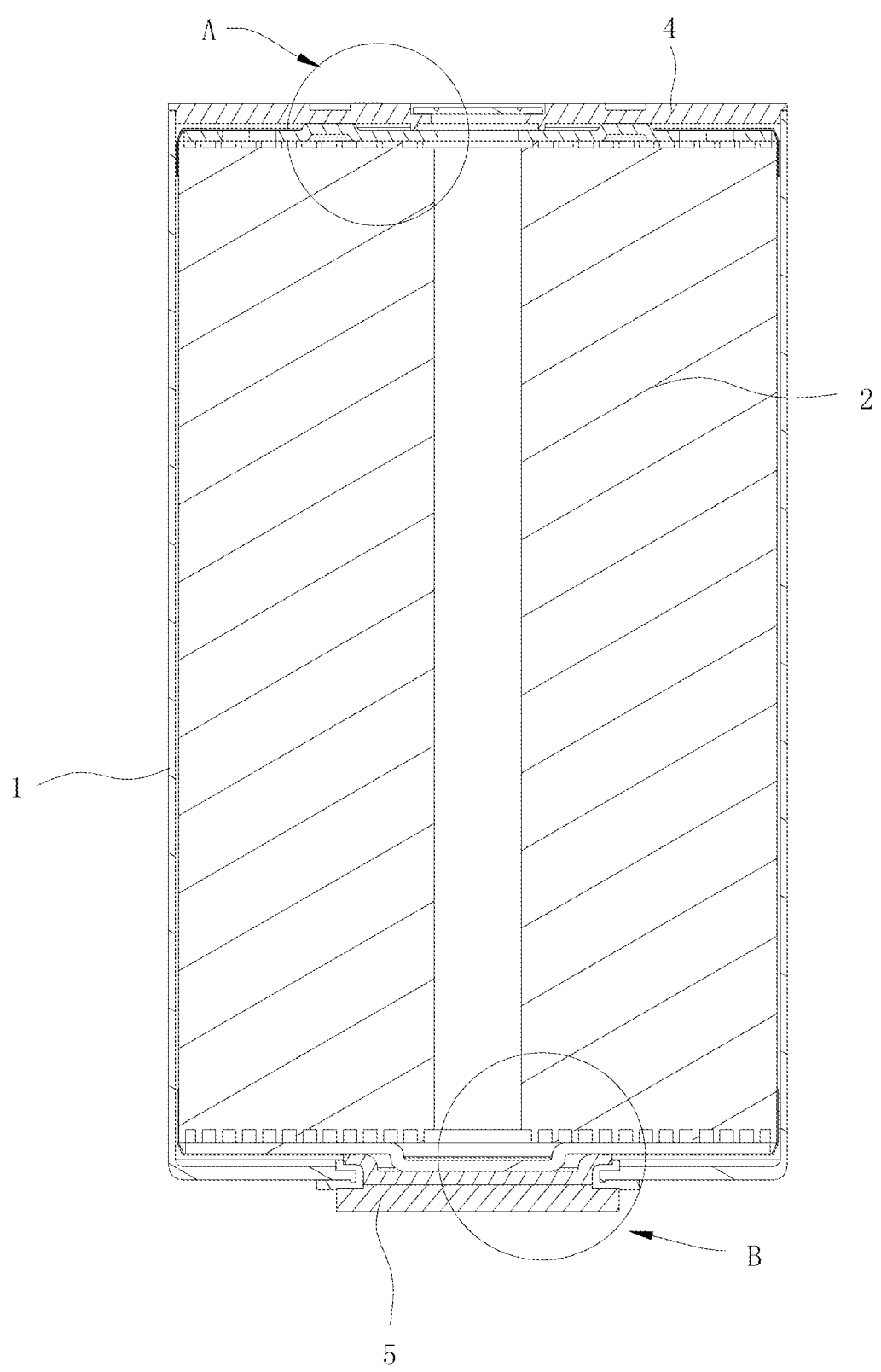
FIG. 4 is a sectional view of a battery according to some embodiments of the present application.
Figure 5:
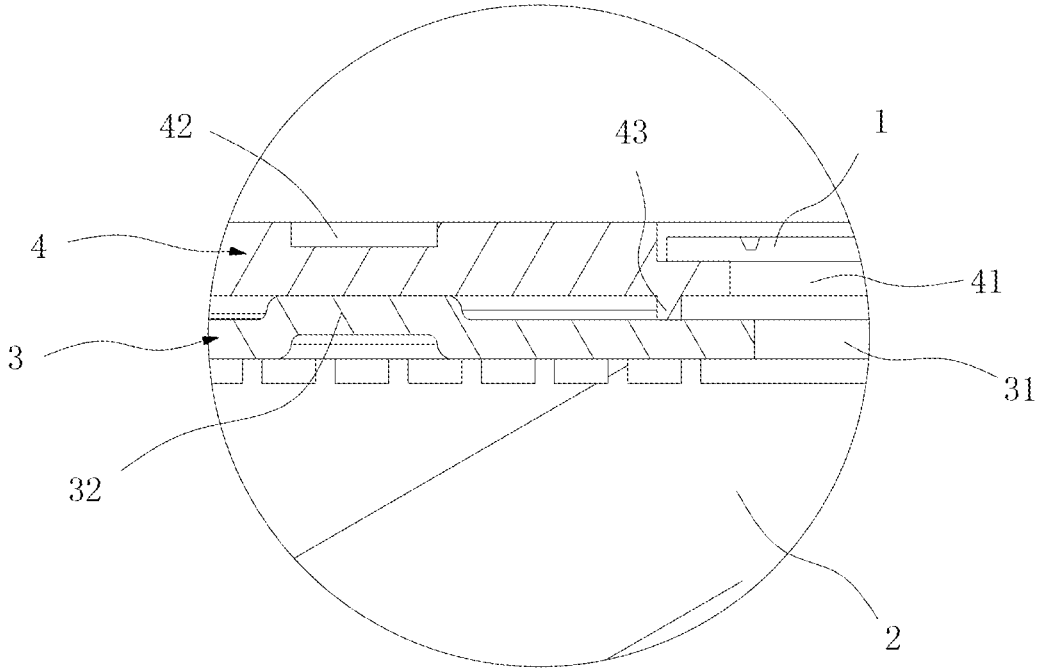
FIG. 5 is a partial enlarged view of a part A in FIG. 4.
Figure 6:
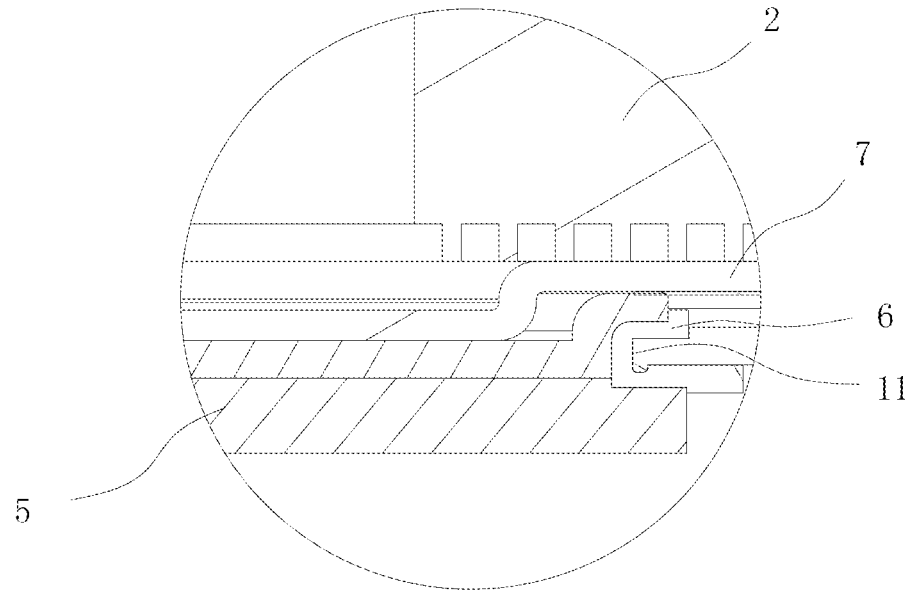
FIG. 6 is a partial enlarged view of a part B in FIG. 4.

Exemplarily, as shown in FIG. 4 and FIG. 6, the battery also includes a pole 5 and a sealing ring 6. The end of the housing 1 facing away from the plate 4 is provided with a pole hole 11. Part of the pole 5 is inserted into the pole hole 11. The sealing ring 6 is disposed between the housing 1 and the pole 5. In this embodiment, the pole 5 is a negative pole. The plate 4 and the housing 1 are welded to form a positive electrode. Therefore, to avoid a short circuit of the battery, the pole 5 and the housing 1 are insulated and sealed by the sealing ring 6.

Exemplarily, the core 2 is connected to the pole 5 by a second connection piece 7. To avoid electrical connection between the second connection piece 7 and the housing 1, an insulating adhesive layer is wrapped on the second connection piece 7, thereby preventing corrosion or breakdown of the housing 1 caused by connection between the pole 5 and the housing 1.

Exemplarily, the housing 1 is made of an aluminum metal material. The aluminum metal material is light in weight. Thus, lightweight design is carried out for the battery.

The manufacturing steps of the battery include the following.

In S100, the pole 5 and the housing 1 are prefixed.

In S200, a negative terminal of the core 2 is welded to the second connection piece 7, and a positive terminal of the core 2 is welded to the first connection piece 3.

In S300, the insulating adhesive layer wraps the area of the second connection piece 7 excluding the to-be-welded area of the second connection piece 7. Then, the sidewall of the first connection piece 3 is wrapped by using the insulating adhesive layer.

In S400, the negative terminal of the core 2 is inserted into the housing 1, and the second connection piece 7 is welded to the pole 5.

In S500, the second boss 32 of the first connection piece 3 abuts against the plate 4. Laser welding is performed from the groove bottoms of the arc-shaped grooves 42 of the plate 4.

In S600, the plate 4 is welded to the housing 1 to complete the assembly of the battery.

In S700, an electrolyte is injected into the liquid injection hole 44 of the plate 4.

The manufacturing of the battery is completed by the preceding steps. The whole assembly step is simple and convenient, the folding installation process of the connection piece is eliminated, and the assembly efficiency is improved.

The present application also provides a battery module. The battery module includes the battery according to any one of the preceding. The connection reliability of the battery is good. The explosion-proof hole is disposed in the middle of the plate 4 so that the air leakage effect is good. Thus, the battery module using the battery has higher safety.

In the description of the present application, it is to be understood that the orientation or position relationships indicated by terms "upper", "lower", and the like are the orientation or position relationships shown in the drawings, merely for ease of description and simplifying operations, and these relationships do not indicate or imply that the referred apparatus or element has a specific orientation and is constructed and operated in a specific orientation, and thus it is not to be construed as a limitation to the present application.

In the description of the specification, the description of reference terms "an embodiment" and the like means that specific features, structures, materials, or characteristics described in connection with the embodiment are included in at least one embodiment or example of the present application. In the specification, the schematic representation of the preceding terms does not necessarily refer to the same embodiment.

Moreover, it is to be understood that although this specification is described in terms of the embodiments, not each embodiment includes only one independent technical solution. Such description mode of the specification is merely for the sake of clarity, and those skilled in the art should regard the specification as a whole. The technical solutions in the embodiments may also be appropriately combined to form other embodiments which can be understood by those skilled in the art.

What is claimed is:

1. A battery, comprising: a housing, a core, a first connection piece, and a plate, wherein the core is disposed in the housing, the first connection piece is disposed on one end of the housing, the first connection piece is connected to the core, and the plate is disposed on a side of the first connection piece facing away from the core, wherein a side surface of the plate facing away from the first connection piece is provided with at least two concave arc-shaped grooves at intervals, all of the at least two arc-shaped grooves are uniformly disposed annularly along a center of the plate, and groove bottoms of the at least two arc-shaped grooves are welded to the first connection piece, and wherein an explosion-proof hole is disposed in the middle of the plate, the first connection piece is provided with a vent, the vent is opposite to the explosion-proof hole, a side surface of the plate adjacent to the first connect on piece is provided with a first boss, the first boss surrounds the explosion-proof hole, and an end surface of the first boss facing away from the plate is connected to the first connection piece.

2. The battery according to claim 1, wherein the two arc-shaped grooves are symmetrically disposed along the explosion-proof hole, a liquid injection hole is disposed on the plate, and the liquid injection hole is disposed on a symmetrical axis of the two arc-shaped grooves.

3. The battery according to claim 2, wherein the plate is connected to the housing to jointly form a first electrode of the battery.

4. The battery according to claim 1, wherein a side surface of the first connection piece facing the plate is provided with a second boss corresponding to the at least two arc-shaped grooves, and the second boss abuts against the plate.

5. The battery according to claim 4, wherein a length of a wide side of the second boss is L1, and a length of a wide side of each arc-shaped groove of the two arc-shaped grooves is L2, wherein L1>L2.

6. The battery according to claim 4, wherein the second boss is annular, or a plurality of second bosses are provided, and a number of the plurality of second bosses matches a number of arc-shaped grooves.

7. The battery according to claim 5, wherein the first connection piece is provided with a plurality of liquid leakage holes, and all of the plurality of liquid leakage holes are disposed between the second boss and an edge of the first connection piece.

8. The battery according to claim 1, wherein the plate is connected to the housing to jointly form a first electrode of the battery.

9. The battery according to claim 1, wherein the side surface of the plate facing away from the first connection piece is a planar structure.

10. The battery according to claim 1, further comprising a pole and a sealing ring, wherein an end surface of the housing facing away from the plate is provided with a pole hole, the pole is inserted into the pole hole, and the sealing ring is disposed between a hole wall of the pole hole and the pole.

11. The battery according to claim 1, further comprising a pole, wherein the core is connected to the pole by a second connection piece, and an insulating adhesive layer is wrapped on the second connection piece.

12. A battery module, comprising: a battery, wherein the battery comprises a housing, a core, a first connection piece, and a plate, wherein the core is disposed in the housing, the first connection piece is disposed on one end of the housing, the first connection piece is connected to the core, and the plate is disposed on a side of the first connection piece facing away from the core, wherein a side surface of the plate facing away from the first connection piece is provided with at least two concave arc-shaped grooves at intervals, all of the at least two arc-shaped grooves are uniformly disposed annularly along a center of the plate, and groove bottoms of the at least two arc-shaped grooves are welded to the first connection piece, and wherein an explosion-proof hole is disposed in the middle of the plate, the first connection piece is provided with a vent, the vent is opposite to the explosion-proof hole, a side surface of the plate adjacent to the first connect on piece is provided with a first boss, the first boss surrounds the explosion-proof hole, and an end surface of the first boss facing away from the plate is connected to the first connection piece.

13. The battery module according to claim 12, wherein the two arc-shaped grooves are symmetrically disposed along the explosion-proof hole, a liquid injection hole is disposed on the plate, and the liquid injection hole is disposed on a symmetrical axis of the two arc-shaped grooves.

14. The battery module according to claim 12, wherein a side surface of the first connection piece facing the plate is provided with a second boss corresponding to the at least two arc-shaped grooves, and the second boss abuts against the plate.

15. The battery module according to claim 14, wherein a length of a wide side of the second boss is L1, and a length of a wide side of each arc-shaped groove of the two arc-shaped grooves is L2, wherein L1>L2.

16. The battery module according to claim 14, wherein the second boss is annular, or a plurality of second bosses are provided, and a number of the plurality of second bosses matches a number of arc-shaped grooves.

17. The battery module according to claim 15, wherein the first connection piece is provided with a plurality of liquid leakage holes, and all of the plurality of liquid leakage holes are disposed between the second boss and an edge of the first connection piece.

18. The battery module according to claim 12, wherein the plate is connected to the housing to jointly form a first electrode of the battery.

19. The battery module according to claim 12, wherein the side surface of the plate facing away from the first connection piece is a planar structure.

20. The battery module according to claim 12, further comprising a pole and a sealing ring, wherein an end surface of the housing facing away from the plate is provided with a pole hole, the pole is inserted into the pole hole, and the sealing ring is disposed between a hole wall of the pole hole and the pole.

\* \* \* \* \*